United States Patent
Swearingen et al.

(10) Patent No.: US 10,073,811 B2
(45) Date of Patent: *Sep. 11, 2018

(54) SYSTEMS AND METHODS FOR MONITORING HEALTH OF VIBRATION DAMPING COMPONENTS

(71) Applicant: THE BOEING COMPANY, Huntington Beach, CA (US)

(72) Inventors: Kevin L. Swearingen, St. Charles, MO (US); Bradley J. Mitchell, Snohomish, WA (US); Jeanne C. Maggiore, Wildwood, MO (US); Stephen Gregory Dame, Everett, WA (US); David A. Followell, Wildwood, MO (US); Dane Joe Grgas, Rancho Palos Verdes, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/989,900

(22) Filed: Jan. 7, 2016

(65) Prior Publication Data

US 2016/0117869 A1    Apr. 28, 2016

Related U.S. Application Data

(63) Continuation of application No. 13/311,632, filed on Dec. 6, 2011, now Pat. No. 9,342,481.

(51) Int. Cl.
*G01M 17/00* (2006.01)
*G06F 17/00* (2006.01)
(Continued)

(52) U.S. Cl.
CPC .............. *G06F 17/00* (2013.01); *B64D 45/00* (2013.01); *B64F 5/60* (2017.01); *G01M 17/04* (2013.01);
(Continued)

(58) Field of Classification Search
CPC ......... G06F 17/00; G01M 17/00; G07C 5/008
(Continued)

(56) References Cited

U.S. PATENT DOCUMENTS 5,239,789 A * 8/1993 Uno .................... F16F 7/1002
52/1
7,729,829 B2 * 6/2010 Messih ............... B60R 21/0132
180/282

(Continued)

FOREIGN PATENT DOCUMENTS

FR    2834338 A1    7/2003
WO    2004048134 A2    6/2004
(Continued)

OTHER PUBLICATIONS

Combined Search and Examination Report of Application No. GB1221616.4 dated Jan. 25, 2013, 13 pgs.
(Continued)

*Primary Examiner* — Shardul D Patel
(74) *Attorney, Agent, or Firm* — Armstrong Teasdale LLP

(57) ABSTRACT

A method for health monitoring of a damper associated with a landing gear is described which includes receiving sensor data from a pressure transducer and an accelerometer and optionally a thermal sensor operably mounted on or near the damper, a computer system, and applying, using the computer system, a diagnostic algorithm to the sensor data to induce and predict the health of the damper.

20 Claims, 5 Drawing Sheets

(51) Int. Cl.
  *G01M 17/04* (2006.01)
  *G07C 5/00* (2006.01)
  *B64D 45/00* (2006.01)
  *B64F 5/60* (2017.01)
  *B64C 25/50* (2006.01)

(52) U.S. Cl.
  CPC ............ *G07C 5/008* (2013.01); *B64C 25/505* (2013.01); *B64D 2045/0085* (2013.01)

(58) Field of Classification Search
  USPC ........... 701/29.1, 31.9, 33.4, 34.3, 124, 31.4
  See application file for complete search history.

(56) References Cited

U.S. PATENT DOCUMENTS

| | | | |
|---|---|---|---|
| 8,020,807 B2* | 9/2011 | Bachmeyer et al. | 244/100 R |
| 2003/0172714 A1* | 9/2003 | Maeno | G01M 7/08 73/12.01 |
| 2004/0162651 A1 | 8/2004 | Halm et al. | |
| 2005/0187677 A1* | 8/2005 | Walker | B64C 13/20 701/16 |
| 2006/0144997 A1 | 7/2006 | Schmidt et al. | |
| 2007/0056376 A1* | 3/2007 | King | G01H 1/003 73/660 |
| 2007/0069072 A1* | 3/2007 | Luce | B64C 25/60 244/104 FP |
| 2007/0272023 A1 | 11/2007 | Dwyer et al. | |
| 2008/0033607 A1* | 2/2008 | Zeliff | B64D 45/0005 701/31.4 |
| 2010/0121504 A1* | 5/2010 | Jones | B64D 45/00 701/16 |
| 2010/0161174 A1* | 6/2010 | Yates | B64D 45/00 701/16 |
| 2010/0211253 A1 | 8/2010 | Morais Dos Santos et al. | |
| 2010/0315248 A1 | 12/2010 | Townsend et al. | |
| 2012/0053784 A1* | 3/2012 | Schmidt | B64F 5/60 701/33.4 |
| 2012/0095703 A1* | 4/2012 | Zakrzewski | B64C 25/00 702/42 |
| 2012/0095622 A1 | 8/2012 | Lynch et al. | |
| 2013/0020436 A1* | 1/2013 | Ducos | B64C 25/12 244/102 A |

FOREIGN PATENT DOCUMENTS

| | | |
|---|---|---|
| WO | 2006053433 A1 | 5/2006 |
| WO | 2012021179 A2 | 2/2012 |

OTHER PUBLICATIONS

Patkai, B. et al.; Requirements for RFID-based Sensor Integration in Landing Gear monitoring—A Case Study; Jul. 16, 2007; Auto-ID LABS; pp. 1-27.

Aerospace Information Report—Landing Gear Structural Health Monitoring; SAE Aerospace; Feb. 2011; pp. 1-20.

* cited by examiner

SYSTEMS AND METHODS FOR MONITORING HEALTH OF VIBRATION DAMPING COMPONENTS

CROSS REFERENCE TO RELATED APPLICATIONS

This application is a continuation of, and claims priority to, U.S. patent application Ser. No. 13/311,632 filed Dec. 6, 2011, entitled "SYSTEMS AND METHODS FOR MONITORING HEALTH OF VIBRATION DAMPING COMPONENTS," which is hereby incorporated by reference in its entirety.

BACKGROUND

The field of the disclosure relates generally to monitoring of vehicle health, and more specifically, to systems and methods for monitoring health of vibration damping components.

In one example, aircraft landing gear may oscillate or shimmy significantly during takeoff or landing rollout at certain speeds due to one or more combinations of runway conditions, usage, design, wear (free play), applied loads, and angular alignment with the runway. This shimmy is undesirable because it induces additional stress into the airframe, can induce premature failure of landing gear components, and is distracting to the crew and passengers.

A typical method to reduce this oscillation/shimmy is via a passive (shock absorber) or active (actuator) pneumatic or hydraulic damper which mechanically links the stationary upper portion of the aircraft gear assembly and the dynamic rotating/pivoting lower portion attached to the wheels. The damper functions to reduce oscillation and shimmy while not impacting the lower gear assembly's motion requirements for shock absorption, steering, and load reduction induced from the alignment of the aircraft with the runway.

Currently it is not possible to determine the functional capability of these dampers via self testing because dynamic loads induced by aircraft landing, take-off or ground maneuver are needed to initiate the shimmy, there are no systems or mechanisms to assess their performance, and the onset of failure is very subtle. Furthermore, there are situations where the crew perceives an aircraft vibration that does not originate from landing gear shimmy, thus inducing an unwarranted maintenance action.

The current maintenance process for such dampers is to wait until evidence of damper failure is unequivocal, as evidenced by a pilot handling report, by visual observation, or by detection of ancillary damage to the landing gear. There are no practical means to determine or predict failure of the damper before witnessing the landing gear shimmy during a landing.

BRIEF DESCRIPTION

In one aspect, a method for health monitoring of a damper associated with a landing gear is provided. The method includes a computer system receiving sensor data from one or more of a pressure transducer, an accelerometer, and a thermal sensor operably mounted on the damper or landing gear assembly, and applying, with the computer system, a diagnostic algorithm to the sensor data to establish the health of the damper.

In another aspect, a health monitoring system for a damper is provided that includes a pressure transducer operably mounted to the damper to output pressure data, an accelerometer operably mounted to the dynamic (moving) landing gear assembly to output vibration data, an optional thermocouple mounted to the damper or landing gear, and a processor module proximate to the damper to which the pressure transducer, the accelerometer, and optional thermocouple are communicatively linked. The processor module is programmed to collect sensor data comprising the pressure data, the vibration data, and optionally the temperature data, and package the sensor data for transmission to a data concentrator device where the data will be further collated with other sensor data and/or processed with a diagnostic algorithm to determine the damper's health, or communicated to a computer system for further processing and interpretation as damper health.

In still another aspect, apparatus for damper health monitoring is provided that includes one or more distributed oscillation measurement transducers capable of measuring response attributes of one or more vibration damping components, and at least one processor capable of receiving analyzing data extracted from the one or more distributed oscillation measurement transducers to determine a real-time health, predict future health state, and establish current performance capability of the one or more vibration damping components.

The features, functions, and advantages that have been discussed can be achieved independently in various embodiments or may be combined in yet other embodiments further details of which can be seen with reference to the following description and drawings.

DETAILED DESCRIPTION

The described embodiments are directed to the identification and classification of damper states during normal operations, thus avoiding unwarranted maintenance. Landing gear systems are subject to loads and vibrations due to the forces experienced during aircraft take off and landing operations. Left unchecked, such vibrations will induce damage to the landing gear and associated components. Damping devices are installed in aircraft to counteract such vibrations, but have a limited useful life as they degrade over time. As they degrade, vibration levels increase and will result in landing gear and other associated component degradation. Systems and methods to detect and predict the health of such damping devices are described herein. The systems and methods are utilized to prevent failures in landing gear due to oscillation and the like. Such a system includes sensors, wired and wireless communication devices, and a computer system running an algorithm to assess damper health as further described herein.

While the embodiments described herein are described with respect to landing gear and landing gear components, it should be understood that the embodiments are applicable to any vibration damping device, such as, but not limited to, those that may be incorporated in conjunction with a flight control surface, steering mechanism, or other passively and actively controlled system capable of movement.

Figure 1:
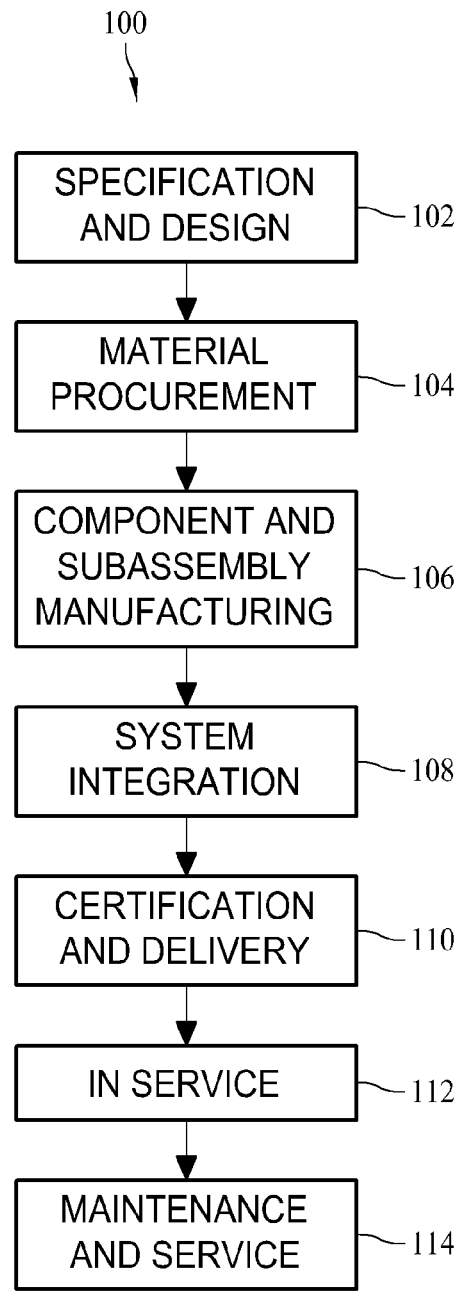
FIG. 1 is a flow diagram of an aircraft production and service methodology.
Figure 2:
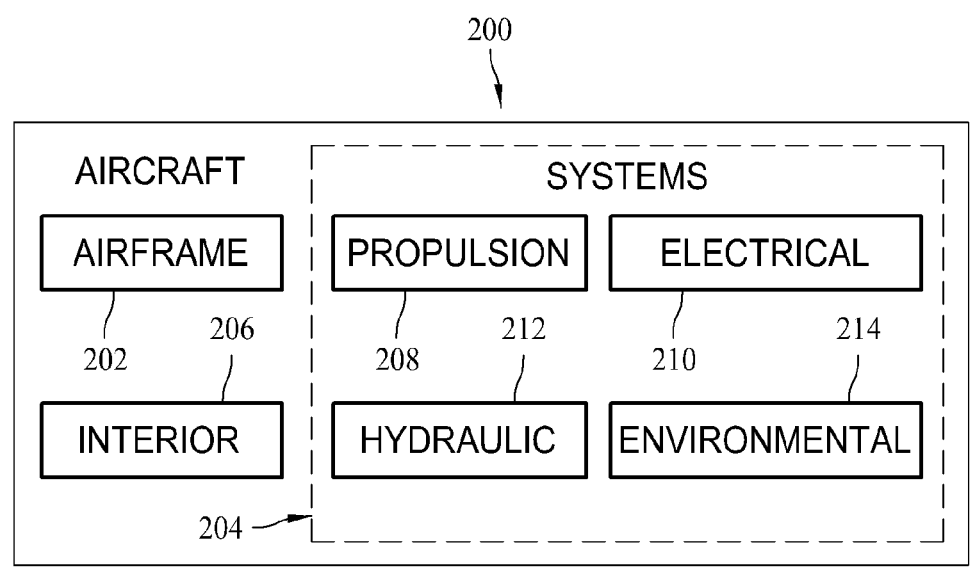
FIG. 2 is a block diagram of an aircraft.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
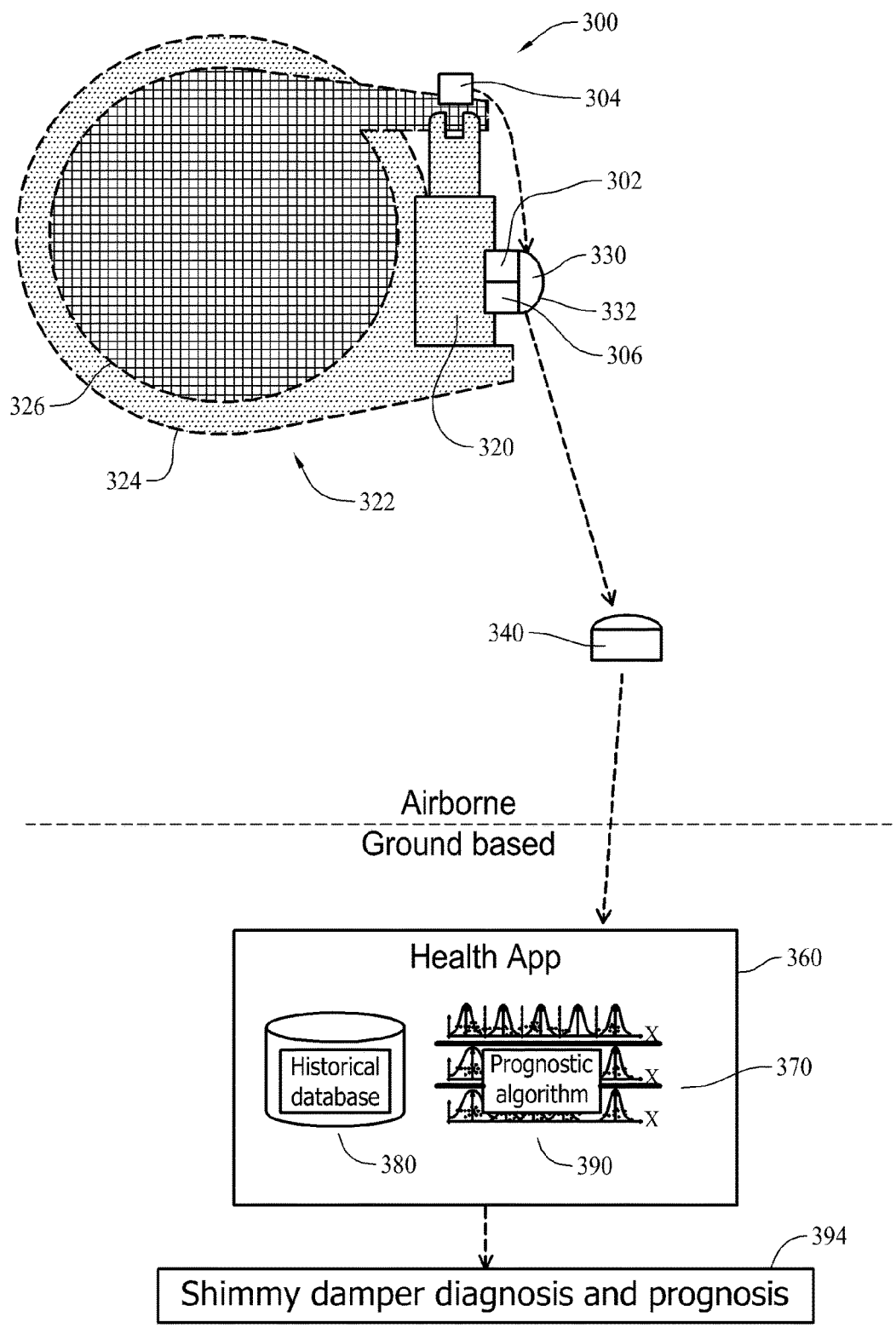
FIG. 3 is a block diagram of one embodiment of a damper monitoring system.

FIG. 3 is a block diagram of a damper monitoring system 300. System 300 includes a pressure transducer 302 and an accelerometer 304. In one embodiment, a thermal sensor 306 is included in system 300. In combination, the sensors measure pressure and temperature of damper 320 and vibration and temperature in landing gear components 322 that includes both static landing gear assembly 324 and dynamic landing gear assembly 326. As such, damper 320 is representative of both passive shimmy dampers and active hydraulically controlled dampers that are utilized in aircraft landing gear applications. One example of an active hydraulically controlled damper is a hydraulic steering control actuator and valve assembly that functions as a vibration damping device.

More specifically, the sensors generate data to landing gear use and damper health. Pressure transducer 302 provides data indicative of pressure variations over time. Accelerometer 304 provides data related to dynamic landing gear component vibrations over time. Optional thermal sensor(s) (not shown) provide data, for example, temperature data and output temperature data related to temperature changes over time.

The sensors communicate with a processor module 330, which in embodiments includes a single-board computer or other electronic device that hosts a radio 332. In alternative embodiments, processor module 330 is connected to radio 332 via wire or there is a wireless connection between the two. Processor module 330 controls power applied to the sensors, and is either powered by direct connection to aircraft power or may be powered by long-life batteries or an energy harvesting apparatus to generate electrical power from the vibration inherent in aircraft landing gear. A health monitoring system may further include an energy harvesting device operable to utilize vibrations of the landing gear assembly (landing gear) to generate power to operate one or more pressure transducer, accelerometer, and processor module. The processor module 330 determines when to transmit sensor data to minimize energy use and radio bandwidth. The processor module 330 performs initial data manipulation and formats it for transmission to a data concentrator 340, which may also act as a wireless receiver in some embodiments.

Data concentrator 340 is a radio and processor module, single board computer or other electronic device that receives the sensor data from one or more processor modules 330 (one per landing gear) and hosts a diagnostic algorithm to consume that data and produce damper health values. In another embodiment, the radio and processor modules are separate devices.

Data concentrator 340 is also connected via a wired or wireless connection to the aircraft (not shown) so that data concentrator 340 may retrieve relevant aircraft parameters (i.e. ambient air temperature, altitude, airspeed, yaw angle, angle of attack, sink rate, accelerations, and aircraft weight) and for power. In embodiments, data concentrator 340 includes a data access or communication port to provide analysis results when prompted by a ground-based station (external computer system) or ground-based computer 360 which is configured to run a ground-based health application 370. In embodiments, health application 370 is a software module hosted on a computer that communicates with the data concentrator 340 to receive raw sensor data or current health information. The health application 370 includes a database 380 (e.g., historical database) for long term storage and a prognostic algorithm 390 to interact with the database 380 to perform trending and identify predicted health 394 of the damper 320 that receives relevant historical data, historical data from the database 380. In another example, an external system determines a projected health for the damper using a prognostic algorithm that evaluation as inputs historical data and health evaluation. In yet another example, the data concentrator transmits the health assessment and the sensor data to a ground-based health application for storage in a database, e.g., database 380.

When the damper 320 degrades or fails, radial movement of the lower (dynamic) landing gear assembly 326 about the longitudinal axis with respect to the upper (stationary) static landing gear assembly 324 is uncontrolled, potentially resulting in oscillations which may damage the landing gear components 322, the structure to which the landing gear attaches, or the tires. Damper monitoring system 300 helps prevent such damage and therefore supports significant aircraft maintenance cost avoidance. Furthermore, damper monitoring system 300 is capable of determining when shimmy is present or some other factor is causing the aircraft to vibrate. Such a capability eliminates unwarranted maintenance on the damper 320. Finally, damper monitoring system 300 enables the prediction of time to failure of the damper 320. Such a capability allows maintenance to be scheduled in the future, thus avoiding flight interruptions if the damper 320 fails.

Damper monitoring system 300 provides an architecture that may be distributed across multiple airborne and ground-based processors. Further, the system has power consumption that is low enough that an energy harvesting approach for the sensors and local processor module 330 is feasible. Incorporation of system 300 eliminates unwarranted maintenance actions, unequivocally assesses current health of the damper, and predicts future failures in order to perform opportunistic maintenance without disrupting normal flight schedules.

Figure 4:
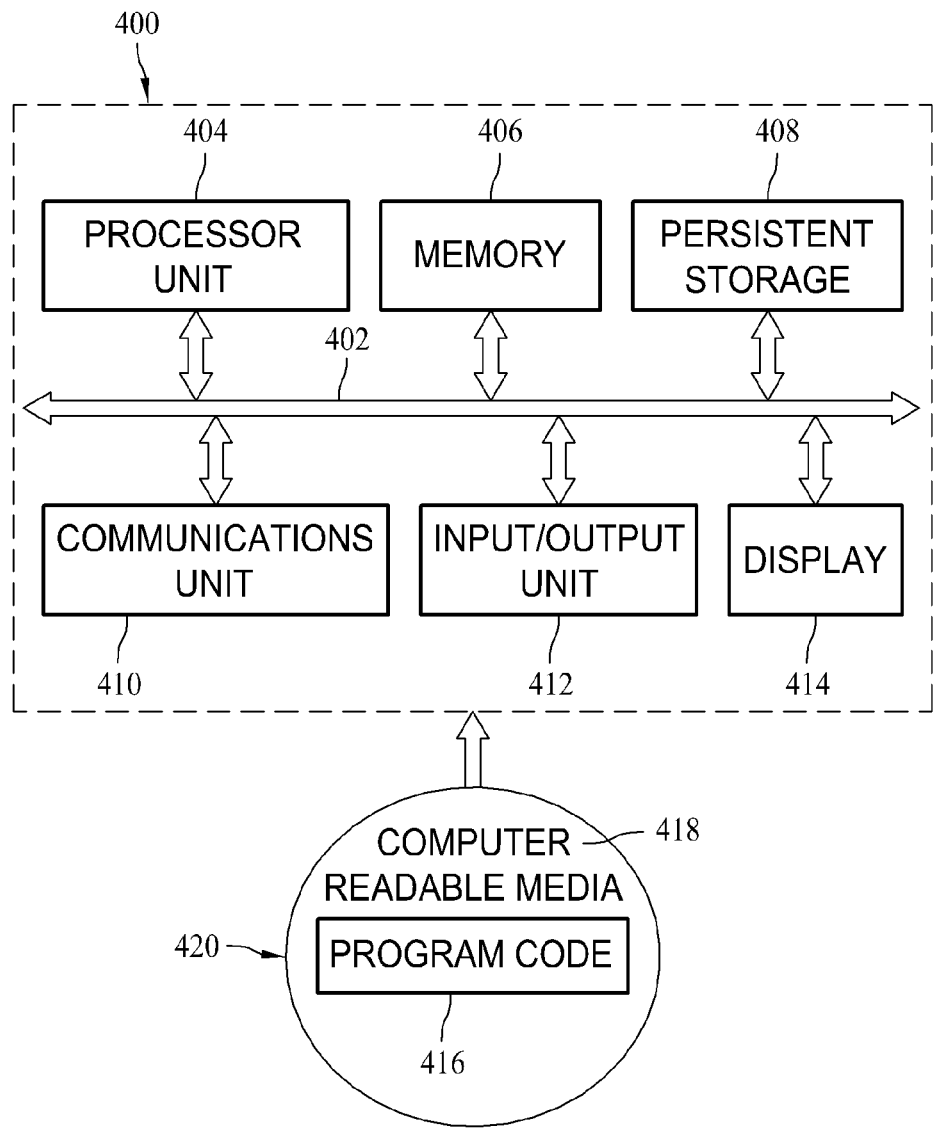
FIG. 4 is a diagram of a computer system.

FIG. 4 is a diagram of an exemplary data processing system 400 that may be used in implementing one or more of the embodiments described herein. For example, ground-based computer 360, health application 370, historical database 380, prognostic algorithm 390, regular expression processing program 49, and/or one or more components of damper monitoring system 300 may be implemented using data processing system 400. In the exemplary embodiment, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices. A storage device is any piece of hardware that is capable of storing information either on a temporary basis and/or on a permanent basis. Memory 406, in these examples, may be, for example, without limitation, a random access memory or any other suitable volatile or non-volatile storage device. Persistent storage 408 may take various forms depending on the particular implementation. For example, without limitation, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, without limitation, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communication links.

Input/output unit 412 allows for input and output of data with other devices that may be connected to data processing system 400. For example, without limitation, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 that is selectively removable and may be loaded onto or transferred to data processing system 400 for execution by processor unit 404. Program code 416 and computer readable media 418 form computer program product 420 in these examples. In one example, computer readable media 418 may be in a tangible form, such as, for example, an optical or magnetic disc that is inserted or placed into a drive or other device that is part of persistent storage 408 for transfer onto a storage device, such as a hard drive that is part of persistent storage 408. In a tangible form, computer readable media 418 also may take the form of a persistent storage, such as a hard drive, a thumb drive, or a flash memory that is connected to data processing system 400. The tangible form of computer readable media 418 is also referred to as computer recordable storage media. In some instances, computer readable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

In some illustrative embodiments, program code 416 may be downloaded over a network to persistent storage 408 from another device or data processing system for use within data processing system 400. For instance, program code stored in a computer readable storage medium in a server data processing system may be downloaded over a network from the server to data processing system 400. The data processing system providing program code 416 may be a server computer, a client computer, or some other device capable of storing and transmitting program code 416.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown.

As one example, a storage device in data processing system 400 is any hardware apparatus that may store data. Memory 406, persistent storage 408 and computer readable media 418 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 406 or a cache such as that found in an interface and memory controller hub that may be present in communications fabric 402.

Figure 5:
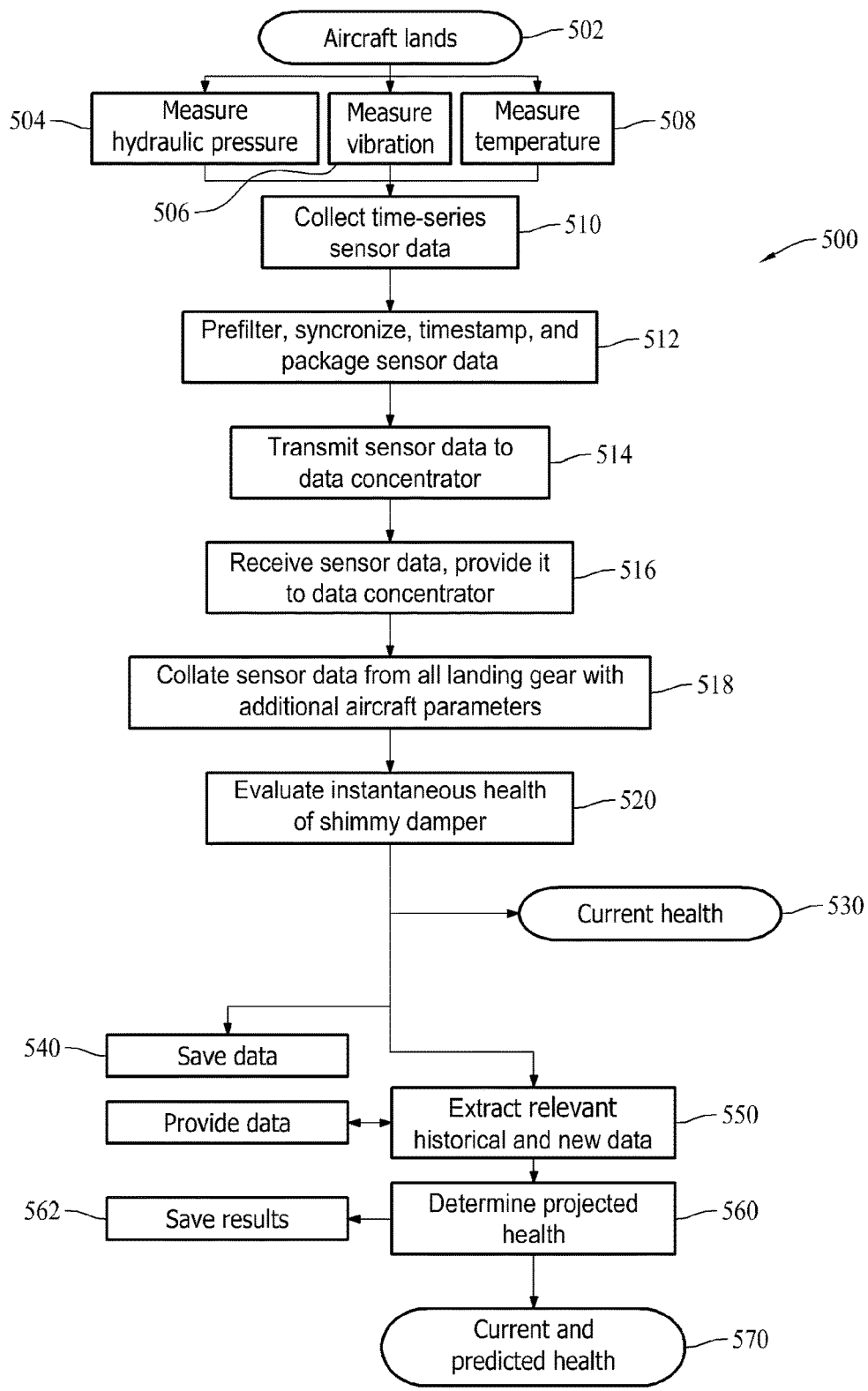
FIG. 5 is a flowchart illustrating the sequence of events which lead to the assertion of damper health using the damper monitoring system of FIG. 3.

The above described system is operable for determining current health and predicting projected health for a damper that is associated with a landing gear. FIG. 5 is a flowchart that illustrates embodiments of a process for health monitoring of a damper. As aircraft lands 502, a pressure transducer measures 504 hydraulic pressure experienced by the damper and an accelerometer measures 506 vibrations experienced by the landing gear. As described above, certain embodiments incorporate a temperature sensor, such as a thermocouple, which measures 508 temperatures experienced by the landing gear or damper. The processor module 330 collects 510 this sensor data, for example, as a time series data and is programmed to package 512 the sensor data for transmission, including one or more functions such as filtering, synchronizing and time stamping of the sensor data. After the packaging 512 is completed, the processor module 300 transmits 514 the sensor data to the data concentrator 340, for example, using a wireless radio transmitter.

As such, the data concentrator 340 receives 516 the sensor data, for example, via a wireless radio receiver and provides the sensor data to the data concentrator function. The data concentrator 340 collates 518 the sensor data, for example, from all of the landing gear of an aircraft (including both active and passive damping mechanisms), with additional aircraft parameter data as explained above.

In embodiments, the data concentrator 340 is operable to evaluate 520 the health of the dampers of an aircraft using a health algorithm executing on the data concentrator 340. The data concentrator 340 further operates to provide the health assessment 530 to a ground station, for example, via an existing wired, wireless, or manual download from the aircraft (data concentrator 340) to the ground-based station (ground system) 360 where such data is saved 540 in the database 380. The health application 370 running on the ground-based station 360 operates to extract 550 relevant historical and new data, provided 552 by the database 380 with which the prognostic algorithm 390 utilizes to determine 560 a projected health that can then be saved 562 to the database 380.

The above described embodiments include a health monitoring system for a damper hat includes one or more of pressure, acceleration, and temperature sensor transducers measuring dynamic attributes of the damper and providing this data to a computer system which also receives data from the aircraft flight control systems. This additional data from the flight control system will be processed along with the damper data to determine the damper's health. Furthermore, the data collected from one or more sets of sensor transducers may also be processed by the computer system to predict the damper's future health state and establish the current performance capability of the one or more vibration damping components.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for health monitoring of a damper associated with a landing gear of an aircraft, the method comprising:
   receiving vibration data measured during ground operations by at least one accelerometer operably mounted on or near the landing gear; and
   applying, with a computer system, a diagnostic algorithm to the vibration data to produce a health assessment of the damper, wherein the damper is configured to reduce a rotational oscillation of a lower landing gear assembly with respect to an upper landing gear assembly.

2. The method according to claim 1 wherein receiving the vibration data comprises:
   receiving the vibration data at a processor module associated with the at least one accelerometer; and
   transmitting the vibration data from the processor module to a data concentrator.

3. The method according to claim 2 further comprising collating the vibration data with a plurality of aircraft parameters received by at least one of the data concentrator and a separate computing system.

4. The method according to claim 2 wherein applying the diagnostic algorithm to the vibration data comprises executing a health algorithm on at least one of the data concentrator and a separate computing system.

5. The method according to claim 1 further comprising transmitting the health assessment and the vibration data to a ground-based health application for storage in a database.

6. The method according to claim 5 further comprising operating the ground-based health application to perform trending and predict a future health of the damper.

7. The method according to claim 1 wherein the damper is one of a plurality of dampers, the method further comprising:
   receiving vibration data associated with each of the plurality of dampers at a respective processor module associated with each damper; and
   transmitting the vibration data from each processor module to a data concentrator.

8. The method according to claim 7 further comprising filtering and time stamping the vibration data at the respective processor modules before transmitting to the data concentrator.

9. The method according to claim 1 wherein applying the diagnostic algorithm comprises determining a source of vibration of the damper.

10. The method according to claim 1 further comprising:
providing the health assessment to a health application operating on an external computer system not aboard the aircraft;
extracting, by the external computer system, relevant historical data from a database; and
determining, by the external computer system, a projected future health for the damper based on the relevant historical data and the health assessment.

11. A health monitoring system for a damper associated with a landing gear of an aircraft, the health monitoring system comprising:
at least one accelerometer mounted on or near the landing gear, said at least one accelerometer operable to measure vibration data during ground operations; and
a diagnostic computer communicatively coupled to said at least one accelerometer, said diagnostic computer programmed to apply a diagnostic algorithm to the vibration data to produce a health assessment of the damper, wherein the damper is configured to reduce a rotational oscillation of a lower landing gear assembly with respect to an upper landing gear assembly.

12. The health monitoring system according to claim 11 further comprising a processor module proximate the damper and communicatively coupled to said at least one accelerometer and said diagnostic computer, said processor module programmed to collect the vibration data from said at least one accelerometer and transmit the vibration data to said diagnostic computer.

13. The health monitoring system according to claim 12 wherein said processor module is further programmed to filter and time stamp the vibration data.

14. The health monitoring system according to claim 11 wherein said diagnostic computer is further programmed to collate the vibration data with a plurality of aircraft parameters received by said diagnostic computer.

15. The health monitoring system according to claim 11 wherein said diagnostic computer is further programmed to transmit the health assessment and the vibration data to a ground-based health application for storage in a database.

16. The health monitoring system according to claim 15 wherein said diagnostic computer is further programmed to perform trending and predict a future health of the damper.

17. The health monitoring system according to claim 11 wherein the damper is one of a plurality of dampers, said health monitoring system further comprising a respective processor module associated with each of the plurality of dampers, each said processor module programmed to receive vibration data associated with said associated damper and to transmit the vibration data to said diagnostic computer.

18. The health monitoring system according to claim 11 further comprising a ground station communicatively coupled to said diagnostic computer, said ground station programmed to:
receive the health assessment from said diagnostic computer;
extract relevant historical data from a database; and
determine a projected future health for the damper based on the relevant historical data and the health assessment.

19. The health monitoring system according to claim 11 further comprising at least one energy harvesting device operable to utilize vibration of the landing gear to generate power to operate said accelerometer.

20. An apparatus for monitoring a health of at least one vibration damping component associated with a landing gear, said apparatus comprising:
at least one accelerometer capable of measuring response attributes of the at least one vibration damping component during ground operations; and
at least one processor capable of receiving and analyzing data extracted from said at least one accelerometer to determine a real-time health, predict a future health state, and establish a current performance capability of the at least one vibration damping component, wherein the at least one vibration damping component is configured to reduce a rotational oscillation of a lower landing gear assembly with respect to an upper landing gear assembly.

* * * * *